United States Patent [19]

Bishop

[11] 4,373,848

[45] Feb. 15, 1983

[54] METHOD AND APPARATUS FOR EXPOSING CONTENTS OF AN OPENED ENVELOPE WITH GRAVITY ASSIST

[75] Inventor: Cliff Bishop, Elmhurst, Ill.

[73] Assignee: AES Technology Systems, Inc., Elk Grove Village, Ill.

[21] Appl. No.: 189,227

[22] Filed: Sep. 22, 1980

[51] Int. Cl.³ .............................................. B65G 65/00

[52] U.S. Cl. .................................... 414/403; 198/689; 270/57; 271/5; 271/107; 271/263; 271/276; 271/303; 414/411; 414/418

[58] Field of Search ............... 53/381 R, 492; 270/55, 270/57; 198/689; 271/5, 107, 276, 263, 303, 10; 414/418, 403, 412, 411

[56] References Cited

U.S. PATENT DOCUMENTS

| | | | |
|---|---|---|---|
| 2,159,987 | 5/1939 | Hartmann et al. | 270/55 |
| 3,238,926 | 3/1966 | Huck | 53/381 R |
| 4,015,523 | 4/1977 | Evans et al. | 271/10 X |
| 4,121,716 | 10/1978 | Luperti et al. | 271/263 X |
| 4,142,430 | 3/1979 | Long et al. | 83/23 |
| 4,145,040 | 3/1979 | Huber | 271/276 |
| 4,200,275 | 4/1980 | Wangermann | 270/55 X |

*Primary Examiner*—Sherman D. Basinger
*Attorney, Agent, or Firm*—Dressler, Goldsmith, Shore, Sutker & Milnamow, Ltd.

[57] ABSTRACT

A method and apparatus is disclosed for exposing the contents of an envelope which has two opposing panels wherein the panels have been separated from each other along all but one edge portion where the panels remain connected. The envelope is gripped on one of the panels and then the envelope is oriented so that at least the contents of the envelope fall away from the gripped panel to thereby expose the envelope contents.

4 Claims, 14 Drawing Figures

FIG. 1
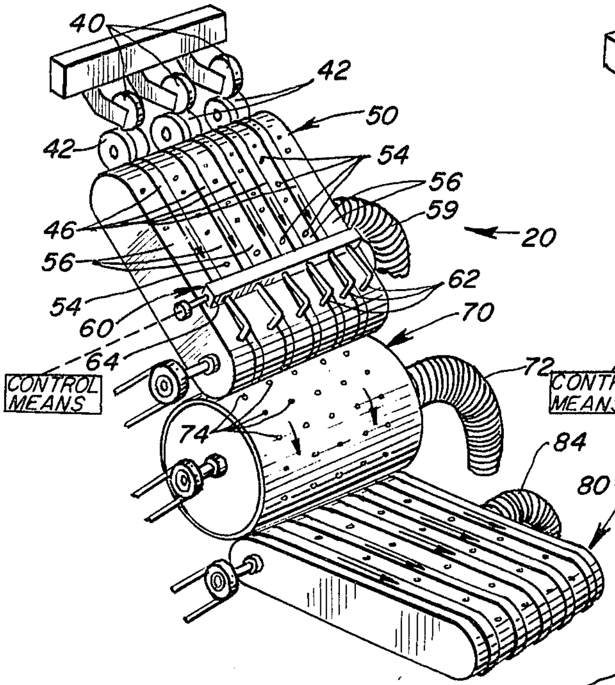
FIG. 2
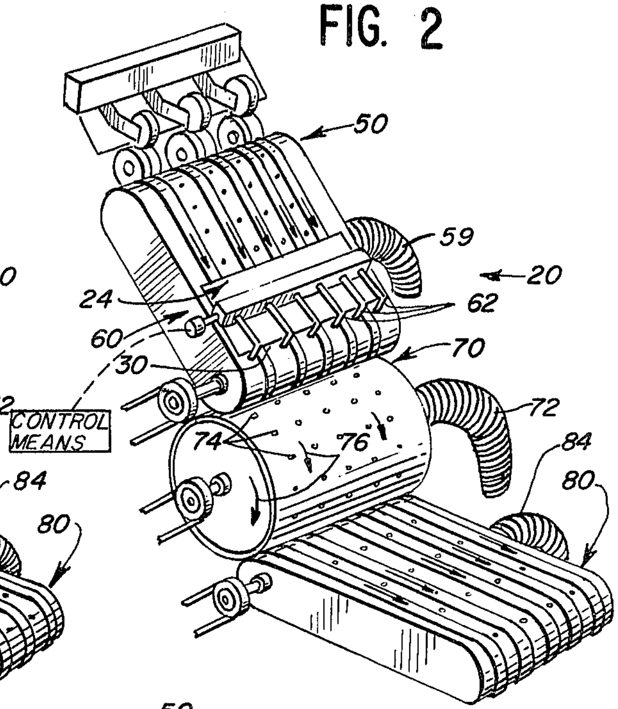
FIG. 3
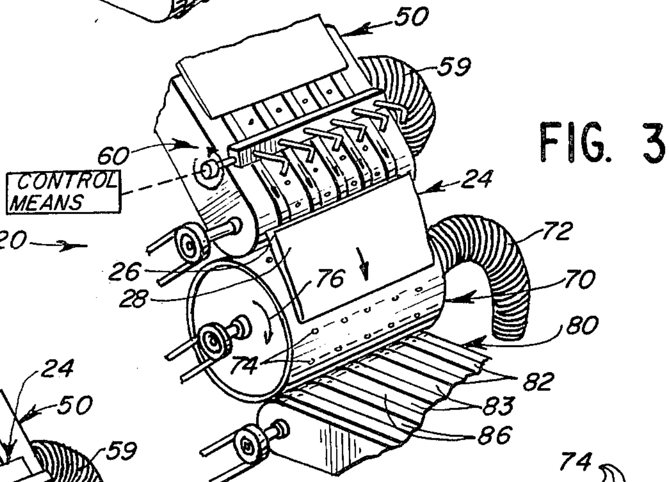
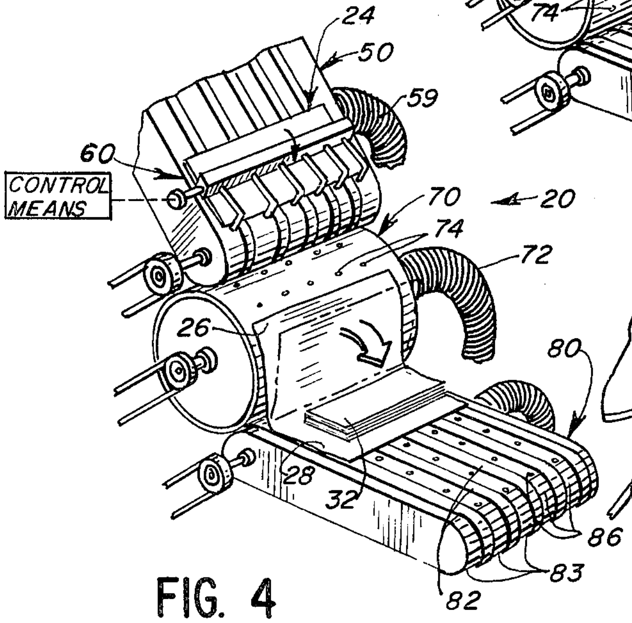
FIG. 4
FIG. 5
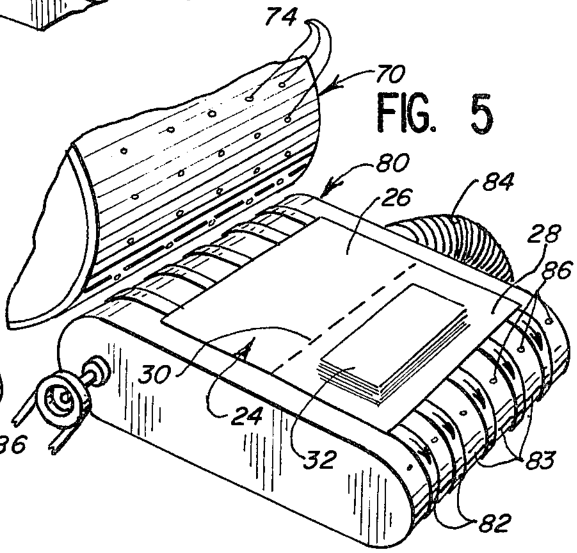

METHOD AND APPARATUS FOR EXPOSING CONTENTS OF AN OPENED ENVELOPE WITH GRAVITY ASSIST

TECHNICAL FIELD

This invention relates to methods and apparatus for exposing the contents of envelopes and most particularly, this invention relates to methods and apparatus for automatically and rapidly exposing the contents of envelopes wherein each envelope has a pair of opposing panels which have been separated from each other along all but one straight edge portion.

BACKGROUND OF THE INVENTION

Apparatus have been developed for opening envelopes by separating the edges of the opposing panels of an envelope by a variety of methods. Such methods include degradation of the envelope material along the envelope edges with heat or chemicals. Other methods include slitting the envelope edges with mechanical knife devices or otherwise separating the envelope panels by means of mechanical destruction of the envelope material.

After the opposing panels of an envelope have been separated from each other along one or more edges, the contents of the envelope must be removed or exposed for subsequent inspection and processing. A number of devices have been developed over the years for also removing or exposing the contents of envelopes.

The U.S. Pat. No. 3,590,548 discloses an envelope opener which weakens three edges of the envelope and includes a differential roller conveyor assembly comprising a conveyor belt and a roller with a brake which is selectively actuated in response to the appearance of the envelope in the opening mechanism to exert a shearing force on the envelope and lay back an edge thereof to expose the contents.

The U.S. Pat. No. 3,384,252 discloses an apparatus in which the top and bottom opposing panels of an envelope are engaged and moved apart by means of suction members. Mechanical clamping elements are then moved into the envelope to grip and remove the contents.

The U.S. Pat. No. 3,884,010 discloses an apparatus in which an envelope, severed along one edge, is gripped by means of a suction member and deposited horizontally in a compressive holder to bow both panels of the envelopes downwardly together. Subsequent upward movement of the suction member carries the engaged panel of the envelope away from the opposite panel to form a double bowed envelope. The envelope is then tilted 90 degrees to permit the contents to fall out of the double bowed envelope.

The U.S. Pat. Nos. 3,116,718 and 3,132,629 disclose various apparatus that use a suction member to lift the uppermost panel of an envelope that has been severed from the opposite panel along three edges. The uppermost panel is then folded back along the remaining unsevered edge that functions as an unfolding line. The contents of the envelope remain on the bottom, non-lifted panel. Movement of the envelope along a conveyor path causes the envelope to completely unfold to thereby expose the contents for extraction and removal.

The U.S. Pat. No. 3,888,069 discloses an apparatus in which an envelope is severed along three edges and moved forwardly between a pair of opposed conveying belts with the unsevered edge in the trailing position. The envelope is conveyed in this orientation beneath a friction roller which peels the top panel of the envelope to completely unfold the envelope and thereby expose the contents.

It would be desirable to provide a relatively simple method for exposing the contents of an envelope which has two opposing panels wherein the panels have been separated from each other along all but one straight edge portion where the panels remain connected. It would be desirable to provide such a method that could be effected with apparatus in which the need for complex mechanical envelope panel and/or contents gripping members is eliminated. Further, it would be desirable to provide a method which could be effected by apparatus in which the mechanical operations performed on the envelope and/or contents are reduced in number, if not eliminated altogether, so as to decrease the probability of the failure of the apparatus to effectively expose the contents of the envelope and so as to enable the apparatus to operate with a relatively high throughput rate.

SUMMARY OF THE INVENTION

A method is provided for exposing contents of an envelope which has two opposing panels wherein the panels have been separated from each other along all but one straight edge portion where the panels remain connected. The method, in a preferred form, includes the steps of gripping one of the panels and then tipping the envelope to orient the connected edge portion of the envelope relative to the rest of the envelope so that at least the envelope contents are uncovered and thereby exposed.

The method can be effected with an apparatus which includes a first suction conveyor for transporting the envelope along a first path. Adjacent the end of the first conveyor is a hollow cylindrical member oriented with its longitudinal axis generally perpendicular to the direction of movement of the envelope along the first conveyor. The cylindrical member includes means for reducing the pressure therein and has apertures communicating with the surface of the cylindrical member so that an envelope is fed by the first conveyor onto the cylindrical member and is retained thereon by a suction effect.

In a preferred method of operation, the envelope is fed onto the cylindrical member with the remaining connected edge leading the rest of the envelope and being fed onto the cylindrical member generally parallel to the longitudinal axis of the cylindrical member.

Instead of feeding the envelopes onto the cylindrical member by means of a conveyor, the envelopes may be arranged in a holder/feeder mechanism adjacent the cylinder. The mechanism can include means for feeding one envelope at a time onto the cylindrical member.

Also, if desired, a mechanism can be provided for cooperating with the cylindrical member to direct certain exceptional envelopes away from the cylindrical member and into a receiving bin. Such exceptional envelopes may include those that are not of a predetermined size, weight, or thickness.

The cylindrical members is rotated to tilt the envelope with the connected edge of the envelope below the rest of the envelope. As the cylindrical member rotates, the ungripped, upper panel of the envelope tends to fall away, under the influence of gravity, from the cylindrical member. Some or all of the contents of the envelope may likewise fall away from the suction-gripped lower panel on the cylindrical member.

A second conveyor is provided adjacent the cylindrical member and receives the ungripped, upper panel of the envelope (and the contents falling with the ungripped panel). The second conveyor has a vacuum producing means for reducing the pressure under the "fallen" envelope panel and for holding that envelope panel thereon as the second conveyor moves the panel forward away from the cylindrical member. As this panel is moved forward, the trailing panel is pulled away from the still-rotating cylindrical member and is pulled onto the second conveyor. The two panels are thus moved along the second conveyor in an "opened" configuration and lying on opposite sides of the connected edge portion with the envelope contents thereby exposed on top of one or both of the panels.

It is thus seen that the above-described method and apparatus of exposing the contents of an envelope can function without the need for complex mechanical envelope panel gripping members or envelope contents removing members.

Numerous other advantages and features of the present invention will become readily apparent from the following detailed description of the invention and embodiments thereof, from the claims and from the accompanying drawings.

BRIEF DESCRIPTION OF THE SEVERAL VIEWS OF THE DRAWINGS

In the accompanying drawings forming part of the specification, and in which like numerals are employed to designate like parts throughout the same, FIG. 1 is a simplified, perspective view of the apparatus for exposing the contents of an envelope in accordance with the teachings of the present invention;

FIG. 2 is a view similar to FIG. 1 but showing an envelope being aligned on the first conveyor;

FIG. 3 is a fragmentary, perspective view of the apparatus illustrated in FIG. 1 but showing an envelope being fed onto the envelope tipping cylinder;

FIG. 4 is a view similar to FIG. 3 but showing the envelope being fed onto the second conveyor wherein the contents and one of the panels have fallen away from the other panel thereby exposing the contents;

FIG. 5 is an enlarged, fragmentary view of the apparatus of FIG. 1 but showing an envelope on the second conveyor with the envelope panels opened and lying on opposite sides of the connected edge portion with the envelope contents thereby exposed on top of one of the envelope panels;

DETAILED DESCRIPTION

Figure 6:
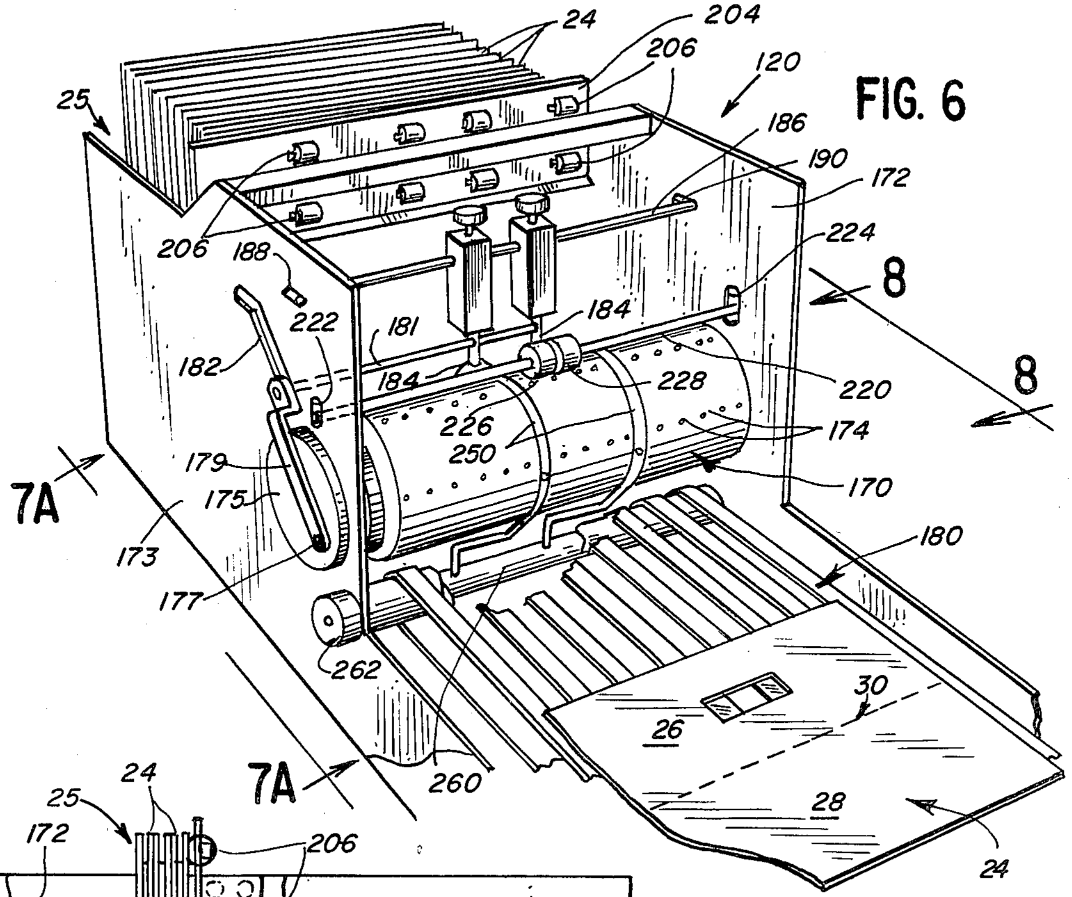
FIG. 6 is a fragmentary, perspective, simplified view of another embodiment of an apparatus for exposing the contents of an envelope.

While this invention is susceptible of embodiment in many differnt forms, there are shown in the drawings and will herein be described in detail a preferred embodiment of the invention. It should be understood, however, that the present disclosure is to be considered as an exemplification of the principles of the invention and is not intended to limit the invention to the embodiments illustrated and/or described.

The precise shapes and sizes of the components herein described are not essential to the operation of the disclosed apparatus unless otherwise indicated.

For ease of description, the disclosed apparatus will be described in a normal operation position, and terms such as upper, lower, horizontal, etc., will be used with reference to this normal operation position. It will be understood, however, that this apparatus may be manufactured, stored, transported and sold in an orientation other than the normal operation position described.

Much of the apparatus disclosed herein has certain conventional drive mechanisms, vacuum producing mechanisms, conveyor mechanisms, and control mechanisms, the details of which, though not fully illustrated or described, will be apparent to those having skill in the art and an understanding of the necessary functions of such mechanisms.

One embodiment of an apparatus that operates in accordance with the teachings of the present invention is illustrated in FIG. 1 and designated therein generally by the reference numeral 20.

The apparatus 20 includes a first conveyor means such as conveyor 50, an envelope tilting or tipping member 70, and a second conveyor means or conveyor 80.

The apparatus receives envelopes 24 seriatim (FIG. 2). Specifically, FIG. 5 illustrates an envelope 24 which has been opened and which comprises a first panel 26 and a second panel 28. The panels 26 and 28 are connected along one generally straight edge portion indicated by dashed line 30 in FIG. 5. The entire contents 32 of the envelope is shown on top of the second panel of the envelope and is thereby exposed for inspection and/or further processing.

When initially fed to the apparatus, each envelope 24 has the two panels oriented in opposing, parallel relationship, but separated from each other along all but the one edge portion 30 where the panels remain connected. The edge portion 30 is typically defined by a straight edge as illustrated, but the present invention would also accommodate an envelope having a non-straight connected edge portion. The apparatus 20 performs certain operations upon each envelope to expose the contents of the envelopes as will next be explained.

The principal elements of the apparatus 20 are illustrated in FIG. 1. The support frame and housing, the various controls, the motors and drive mechanisms, and the vacuum producing mechanisms have been omitted for clarity and to permit certain novel elements of the apparatus to be better illustrated and understood.

Envelopes are fed into the apparatus 20 between upper rolls 40 and lower rolls 42. The rolls 40 and 42, and the mechanisms for feeding the envelopes (not illustrated) into the apparatus 20 may be of any suitable, conventional type and are not part of the present invention.

The envelopes are fed onto the conveyor 50 which may be a conventional vacuum-transport type conveyor. Specifically, the conveyor 50 may be of the type well known in the art and consisting of a plurality of narrow endless belt strips 46 that are entrained over sprockets or wheels (not visible in FIG. 1) on shafts at either end. Such a structure is described in the U.S. Pat. No. 4,015,523 and reference is directed thereto.

Vacuum (or more correctly, a reduced pressure) is established within the housing of conveyor 50 and through apertures 54 defined in the conveyor surface regions 56 between the endless belt strips 46. The vacuum is drawn within the conveyor 50 by means of a suitable system (not illustrated) through a conduit 59.

The belts 46 project a small amount above the adjacent conveyor housing surface regions 56. The endless belt strips 46 on the conveyor 50 are driven by a suitable conventional drive system (not illustrated in detail) and one such drive system is described and illustrated in the U.S. Pat. No. 4,015,523 to which reference is directed.

Located above and toward the bottom end of the conveyor 50 is a gate mechanism 60 which cooperates with the conveyor 50 for aligning an envelope on the conveyor. The gate 60 includes a plurality of fingers 62 positioned on a shaft 64 so as to be in alignment with the lower surface regions 56 between the adjacent edges of the respective belt strips 46 of the conveyor 50 so that the free end of each finger extends slightly below the path defined by the exposed surfaces of the strips 46.

The shaft 64 is periodically turned or rotated through just a portion of a full rotation by suitable drive means (not illustrated), such as a conventional rotary solenoid and gear drive system. Alternatively, other suitable drive means may be used. One such suitable drive means is that illustrated and described in the above-referenced U.S. Pat. No. 4,015,523 for the gate means 24 shown in FIGS. 2 and 6 of that patent.

The gate 60 is operated to normally maintain the fingers 62 in the path of movement of the envelopes on the conveyor 50. Control means (illustrated only schematically with a rectangular box labeled "CONTROL MEANS" in FIGS. 1–4), responsive to the presence of an envelope in the path at the gate 60, are provided for effecting actuation of the gate to raise the fingers 62 out of the path so that the conveyor 50 can move the envelope further along.

FIG. 2 illustrates an envelope 24 on the conveyor 50 and abutting the gate 60 with the connected edge portion 30 of the envelope aligned generally perpendicular to the direction of the envelope movement along the conveyor. The edge 30 of the envelope 24 is thus aligned by the fingers 62 of the gate 60 so that the envelope 24 will be moved by the conveyor 50, upon raising of the gate 60, onto the envelope tilting means or member 70 with the envelope edge 30 generally transverse to the direction of movement.

The envelope tilting or tipping cylinder 70 is a generally cylindrical member oriented with the longitudinal axis substantially or generally normal to the conveying path defined by the conveyor 50. The cylindrical tipping member or cylinder 70 has an interior chamber portion or portions (not visible in the figures) which may be evacuated, by means of a suitable conventional vacuum system, through the flexible conduit 72. The exterior surface of the tilting member 70 has a plurality of apertures 74 which communicate with the interior vacuum chambers and permit the reduced pressure to be effected at the apertures 74 to the underside of the envelope 24 as it is fed from the conveyor 50 onto the member 70 as best illustrated in FIG. 3.

The member 70 is rotated (by drive means not completely illustrated) in a direction indicated by arrows 76 in FIG. 2. Thus, as best illustrated in FIG. 3, when the gate 60 is raised, the envelope 24 is fed by the conveyor 50 onto the rotating tilting member 70 and the first (bottom) panel 26 of the envelope is held against the surface of the member 70 by means of the pressure differential between the reduced pressure within the member 70 and the greater exterior ambient atmospheric pressure.

As best illustrated in FIGS. 3 and 4, continued rotation of the tilting member 70 causes the second (upper) panel 28 of the envelope 24 to fall outwardly away from the gripped first panel 26. The envelope contents 32 likewise may fall with the second panel 28 away from the first panel 26 under the influence of gravity. However, in some cases, none or only some of the contents may fall with the second panel.

Preferably a second conveyor 80 is provided adjacent and below the tilting member 70. The second conveyor 80 is substantially identical to the first conveyor 50 and includes endless belts 82 spaced apart on a housing mechanism in which vacuum may be drawn through a flexible vacuum tube 84 as best illustrated in FIG. 5. Reduced pressure is drawn through apertures 86 in the conveyor regions 83 between the endless strips 82 to hold the envelope against the conveyor 80.

The endless strips 82 are driven by a suitable drive means (not completely illustrated) in the same manner as the first conveyor 50 to move the envelope away from the tilting cylinder 70. As best illustrated in FIG. 5, the envelope is pulled along by means of the second panel 28 on the second conveyor 80 so that the first panel 26 of the envelope is pulled off of the tilting member 70 and then also lies flat on the second conveyor 80. In this orientation, the envelope panels are opened and both panels lie flat on the second conveyor 80 on opposite sides of the connected edge portion 30 with the envelope contents thereby exposed on top of one or both of the panels 26 and 28. In some cases, the entire contents 32 may remain against and on the first panel 26. In other cases, some of the contents may fall upon the second panel 28 with the remainder of the contents lying on the first panel 26. In still other cases, as illustrated, the entire contents may fall on top of the second panel 28.

The conveyor 80 has a length that is chosen to be compatible with the next step in the processing of the envelope and contents. If operators are to inspect and remove the contents 32, the conveyor 80 might be of sufficient length to allow one or more persons to stand or sit alongside. Alternatively, the conveyor 80 may be of a relatively short length and adapted to feed the contents 32 to another apparatus or may be adapted to dump the contents 32 over the end of the conveyor 80 to a suitable receiving mechanism (not illustrated). The opened envelope 24 may continue along the underside of the conveyor 80 to a point where the vacuum is terminated (as by eliminating the vacuum apertures 86) along a bottom portion of the conveyor 80. In such a case, the envelope 24 would then fall away from the conveyor 80 and into a suitable envelope receiving means (not illustrated).

Though the apparatus 20 has been illustrated with a first conveyor, a cylindrical tilting member, and a second conveyor, it is to be realized that these structures are not necessary to expose the contents of an envelope according to the teachings of the present invention.

According to the teachings of the present invention, a method for exposing the contents of an envelope includes the steps of gripping one of the two panels of the envelope and then orienting the envelope so that at least the contents of the envelope are exposed. In the preferred form of the method, the envelope is tipped to orient the connected edge portion of the envelope below the rest of the envelope so as to permit both the ungripped panel and the envelope contents to fall away from the gripped panel under the influence of gravity, thus exposing the envelope contents. However, it is to be realized that the envelope may alternatively be oriented with the connected edge portion *trailing* the rest of the envelope to permit the upper panel to be raised by suitable means and/or to permit the contents to slide out of the envelope.

It is to be noted that during the preferred tipping or tilting process, the envelope is tilted about an axis that is located in the gripped panel of the envelope and that is oriented generally parallel to the connected edge portion of the envelope. The first, or gripped envelope may be held in a curved configuration (as illustrated in the embodiment of FIGS. 1–5) or may be gripped in other configurations, including a generally planar configuration.

In any case, in this preferred form of the method, the envelope is tilted with the connected edge moving to a lower elevation than the rest of the envelope.

As illustrated for the preferred embodiment of the apparatus disclosed herein, the tilting of the envelope may also include an additional, simultaneous translation or movement of the envelope in a path. During this movement of the envelope, the tilting axis will move with the envelope along the envelope movement path. With the apparatus illustrated, the gripped panel is moved by the cylindrical tipping member in a locus defined by a portion of a circular arc. This movement necessarily causes a tilting of the envelope.

It is to be realized that the tilting of the envelope may occur along any line or axis in the envelope gripped panel. For example, the envelope may be pivoted or tilted about an axis coincident with the connected edge, about an axis coincident with the opened edge opposite the connected edge, or about an axis lying between the opened edge and the connected edge.

In the embodiment illustrated in FIGS. 1–5, the envelopes are fed onto a first conveyor 50 by a conventional feeding mechanism (having upper rolls 40 and lower rolls 42). It is to be realized that, in some applications, the first conveyor 50 may be eliminated, along with the gate 60, and that the envelopes may be fed from a conventional feeder directly on the cylinder 70.

Also, it is to be realized that various types of feeding mechanisms may be provided. One such alternate type of feeding mechanism will next be described with reference to another embodiment 120 of the apparatus illustrated in FIGS. 6–8.

As best illustrated in FIG. 6, the alternate feeding mechanism includes a tilting member or cylinder 170 that is similar in many respects to cylinder 70 of apparatus 20 illustrated in FIG. 1. the cylinder is mounted between a pair of opposed side plates 172 and 173. A crank disc 175 is mounted for rotation with the cylinder 170, but exterior of the side plate 173. Pivotably mounted to crank disc 175 with a pin 177 is a crank arm 179.

The crank arm 179 is connected to a bar 181 which projects through a guide slot 182 defined in the side plate 173. Though not illustrated, bar 181 may also extend through a similar slot in the other side plate 172 and may be connected to a crank assembly similar to crank disc 175 and arm 179.

The bar 181 joins a pair of downwardly projecting suction members 184. The suction members 184 are secured near their top ends by another cross bar 186. One end of cross bar 186 is received in a slot 188 defined in side plate 173 and the other end of the cross bar 186 is slidably received in a guide slot 190 defined in side plate 172. Rotation of the crank disc 175 with the cylindrical member 170 (by a suitable drive mechanism, not illustrated) will drive the suction member support bars 181 and 186 forward in their respective slots in the side plates 172 and 173 as illustrated in FIG. 7B.

Figure 7A:
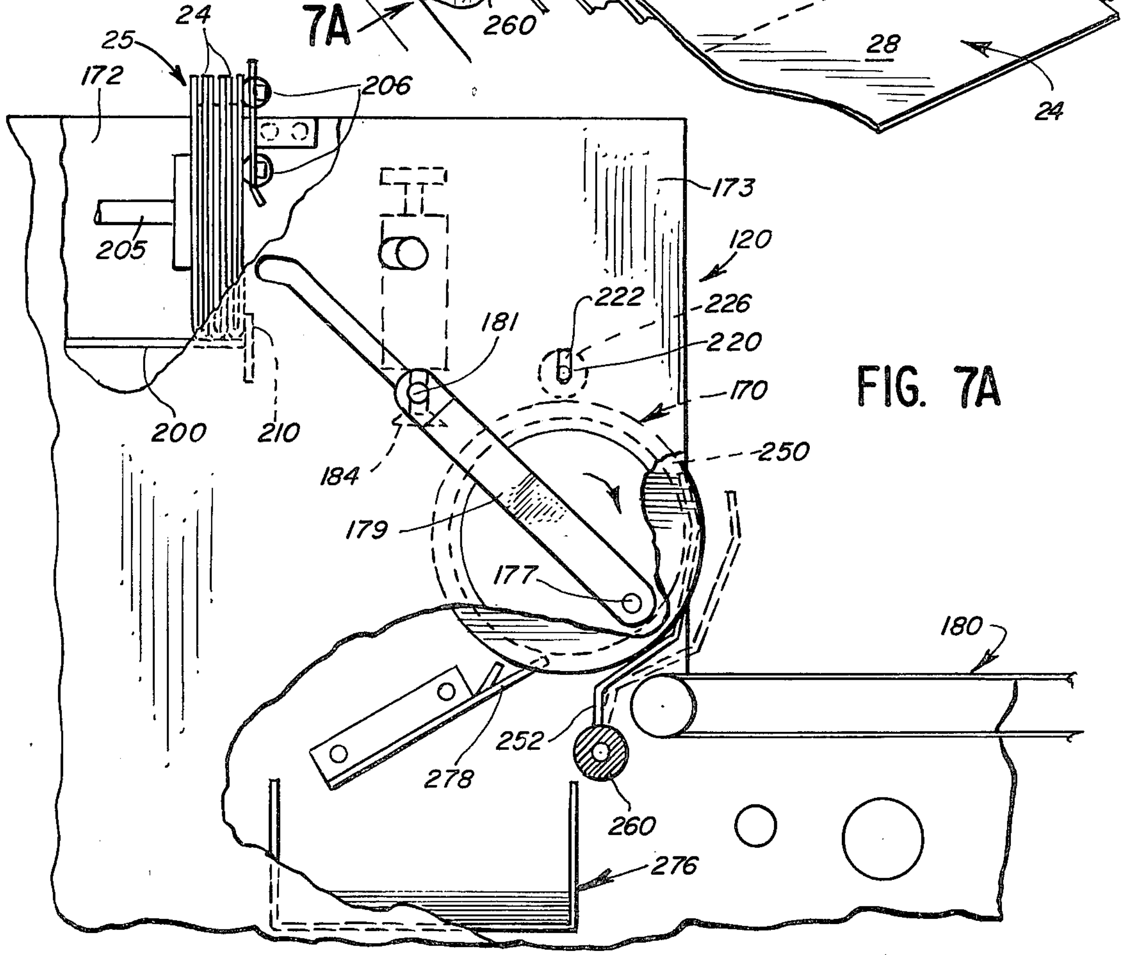
FIG. 7A is an enlarged, fragmentary, side view taken generally along the plane 7A—7A of FIG. 6 with portions of the apparatus cut away to reveal interior structural details.
Figure 7B:
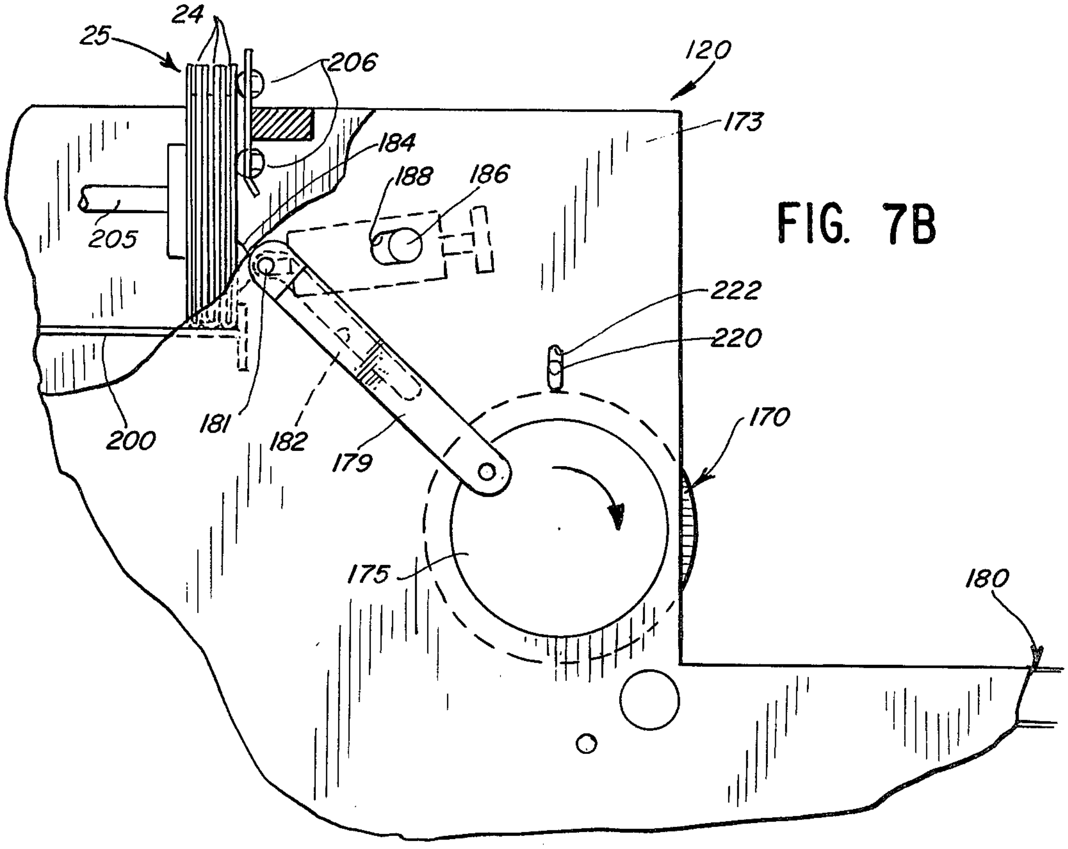
FIG. 7B is a view similar to FIG. 7A but with the suction members moved to a position engaged with the envelope stack.

The suction members are connected to a suitable vacuum source to provide a vacuum gripping of envelopes 24 placed in the apparatus as best illustrated in FIGS. 6 and 7B. The envelopes 24 are arranged and aligned in face-to-face relationship to form a batch with at least one of the edges of each envelope in substantial registration with the corresponding edges of the other envelopes in the batch. As illustrated in FIGS. 6 and 7A, the envelopes in the batch are typically the same size and the bottom edges of the envelopes are supported on a support guide or plate 200.

Each envelope 24 in the batch has been opened on the opposing vertical side edges and along the top edge to leave a connected edge portion along the bottom. The envelopes may be placed in the apparatus 120 within a suitable holding device 25. Such a device 25 may be removable and may also function as the receiving means in an envelope opening device. Preferably, an envelope receiving means or holding device 25 is filled with a batch of envelopes 24 by an envelope opening device with the envelopes arranged in fact-to-face relationship. The holding device 25 is then placed in the apparatus illustrated in FIG. 6 with the envelopes oriented in parallel vertical planes.

Preferably, the envelope batch holding means or device 25 has a substantially open front. The apparatus 120 includes a retaining plate 204 which is adjacent the outermost envelope of the batch when the batch is properly placed within the apparatus. Rollers 206 are mounted on the retainer plate 204 to accommodate the removal of each envelope from the batch by the suction members 184. Also, a motor driven or spring-biased piston 205 is provided on the opposite end of the batch to urge the envelopes against the retainer plate 204.

As best illustrated in FIG. 7B, the suction members 184 move against the outermost envelope 24 of the batch. Suction is applied by suitable means to the suction members 184, as by drawing a vacuum or otherwise reducing the pressure within members 184, in order that the outermost envelope 24 attaches to the members 184 or becomes gripped by members 184. As the cylinder 170 continues its rotation, the crank disc 175 pulls the crank arm 179 and bar 181 back down along the guide slot 182. At the same time, the upper cross bar 186, being secured to the suction members 184, is similarly moved rearwardly in its guide slots 188 and 190. The suction members 184 are thus finally returned to the vertical orientation illustrated in FIGS. 6 and 7A, but now gripping an envelope 24.

The cylinder 170, like the cylinder 70 in the embodiment illustrated in FIG. 1, has a plurality of vacuum apertures 174 which communicate with interior vacuum chambers and permit a reduced pressure to be effected at the apertures 174 on the surface of the cylinder 170. Thus, as the envelope is carried by the suction members 184 against the cylinder 170, a leading portion of the envelope becomes gripped by the cylinder 170.

After the leading portion of the envelope has been gripped by the rotating vacuum cylinder 170, the vacuum in the suction members 184 is terminated to allow the gripped envelope to be transferred entirely to the rotating cylinder 170.

It is seen that when the envelopes 24 are transferred with the suction members 184 to the cylinder 170 as described above, the connected edge portion of each envelope becomes the leading portion of the envelope as the envelope is moved to the cylinder 170. Thus, the connected edge portion of the envelope is the first portion of the envelope to attach to the cylinder 170 and, as the cylinder rotates further (in the clockwise direction as viewed in FIG. 7A), the upper envelope panel will fall away from the cylinder 170 in the same manner as with the envelopes processed by the first embodiment of the apparatus 20 illustrated in FIGS. 1–5.

To prevent more than one envelope from being accidentally pulled away from the batch by the suction members 184, a stripper member or members 210 may be provided at the front of the batch on the end of member 200. As the outermost envelope is pulled away from the batch by the suction members 184, the envelope, being flexible, will bend slightly to ride over the stripper 210. However, the stripper will prevent the next envelope from being pushed off of platform member 200.

A novel means is provided for sensing the thickness of each envelope as it is fed onto the rotating cylinder 170 and for selectively removing any envelope that does not fall within a predetermined thickness range. Specifically, with reference to FIGS. 6, 7A and 8, a shaft 220 is mounted over the cylinder 170. The shaft 220 is received on one end within a vertical guide slot 222 defined in side plate 173 and on the other end within a vertical guide slot 224 defined in side plate 172. A pair of brass rollers 226 and 228 are mounted on the shaft 220. Thus, as an envelope is carried around on the cylinder 170, it passes between the nips defined by the cylinder 170 and the brass rollers 226 and 228. Since the shaft 220, on which the brass rollers 226 and 228 are mounted, is disposed within the vertical slots 222 and 224, the shaft 220 will move upwardly when a thick envelope is carried on the cylinder 170 and will move downwardly when a thin envelope is carried on the cylinder 170.

Figure 8:
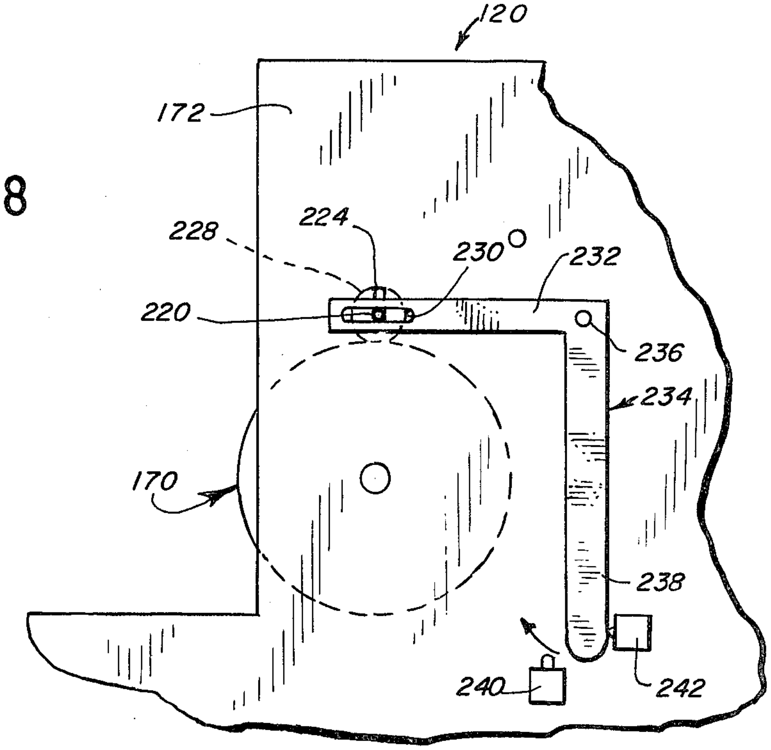
FIG. 8 is an enlarged, fragmentary view taken generally along the plane 8—8 in FIG. 6.

As best illustrated in FIG. 8, the end of the shaft 220 passing through the side plate 172 extends beyond side plate 172 and is received within a slot 230 defined within a first portion 232 of a crank arm 234. The crank arm 234 is pivotably mounted about a pin 236 to the side plate 172 and has a downwardly extending portion 238. Preferably, the portion 238 is considerably longer than the portion 232 for reasons that will be explained thereafter.

A pair of limit switches 240 and 242 are provided adjacent the portion 238 of the angled crank arm 234 and are adapted to be engaged by the crank arm portion 238. The limit switches 240 and 242 are suitably connected in an electrical control circuit so that, upon being engaged by arm 234, they actuate the envelope deflector mechanisms that are described in detail hereinafter.

With continued reference to FIGS. 6 and 8, it can be seen that when an envelope is not passing under the rollers 226 and 228, the rollers 226 and 228 contact the cylinder 170. The roller shaft 220 is then in the lowest position in slot 224 and the crank arm 234 is then engaged with the switch 242. If an envelope is carried between the nips of the rollers 226 and 228 and the cylinder 170, the roller shaft 220 will be moved upwardly in its slot 224 and will cause the angled crank arm 234 to pivot (in a clockwise direction with reference to FIG. 8) away from the switch 242. If the envelope has less than a predetermined thickness, the arm 234 will not be pivoted sufficiently to be disengaged from switch 242. If the thickness of the envelope is in the desired range, the arm 234 will be disengaged from switch 242 but will not engage switch 240. On the other hand, if the thickness of an envelope is relatively great, then the shaft 220 will move much further upwardly in slot 224 and the crank arm 234 will be moved against switch 240.

By appropriate mounting of the switches 240 and 242, the actuation of switch 240 and 242 will occur at a particular desired upper and lower limit, respectively, of envelope thickness. Preferably, to provide more sensitive control, the length of the crank arm portion 232 is considerably less than the length of the crank arm portion 238. Thus, a small movement of the crank arm portion 232 will cause a relatively large movement of the crank arm portion 238.

The mechanism for selectively rejecting envelopes not meeting the thickness criteria as sensed by the switches 240 and 242 is best illustrated in FIGS. 6 and 7A. Specifically, cylinder 170 is seen to have a pair of circumferential grooves 250. A pair of deflector arms 252 are adapted to be received within the grooves 250 and are adapted to be moved between a first position seated within the grooves 250 and a second position (illustrated in dashed line 7A) spaced away from the cylinder 170. To this end, the deflector members 252 are secured to a shaft 260 which is mounted to side plates 172 and 173. An electric solenoid rotary operator 262 is mounted to the side plate 173 and is operatively engaged with the shaft 260. The control circuit of the solenoid 262 is suitably connected with the switches 240 and 242 so that, when the switches 240 and 242 are not actuated by the crank arm 234, the deflector members 252 are held within the cylinder grooves 250. With the deflector members 252 in this position, the envelopes will pass over the deflector members 252 and be carried by the cylinder 170 onto the downstream conveyor 180.

However, if either one of the switches 240 or 242 is actuated by engagement with the crank 234, the solenoid 262 is actuated to move the deflector arms 252 to the second position (illustrated in dashed line in FIG. 7A) so as to guide the envelope to the underside of the cylinder 170. A suitable receiving bin or structure 276 may be provided beneath the cylinder 170 for receiving the rejected envelopes. To ensure that the rejected envelopes will fall away from the cylindrical member 170 and into the receiving bin 276, a pair of suitable stripper fingers 278 may be provided beneath the cylinder 170. The distal ends of the stripper fingers 278 are received within the grooves 250 of the cylinder 170.

Though the cylinder 170 may have a plurality of vacuum apertures 174 extending around the circumference, it has been found that two rows of apertures 174 will function to satisfactorily hold an envelope to the cylinder 170. Preferably, one row of apertures extends across the length of the cylinder 170 in a line generally parallel to the longitudinal axis of the cylinder. A second row of apertures is provided on the cylinder parallel to and spaced from the first row of apertures. The first row of apertures is adapted to hold the leading edge portion (i.e., the connected edge portion) of the envelope. The second row of apertures is adapted to hold the trailing edge portion of the envelope. Preferably, the vacuum in each row of apertures is terminated as that row of apertures moves adjacent the deflector fingers 252. Specifically, and with reference to FIG. 7A, the vacuum is terminated when each row of apertures is moved by the rotating cylinder 170 to the "4 o'clock" position.

Figure 9:
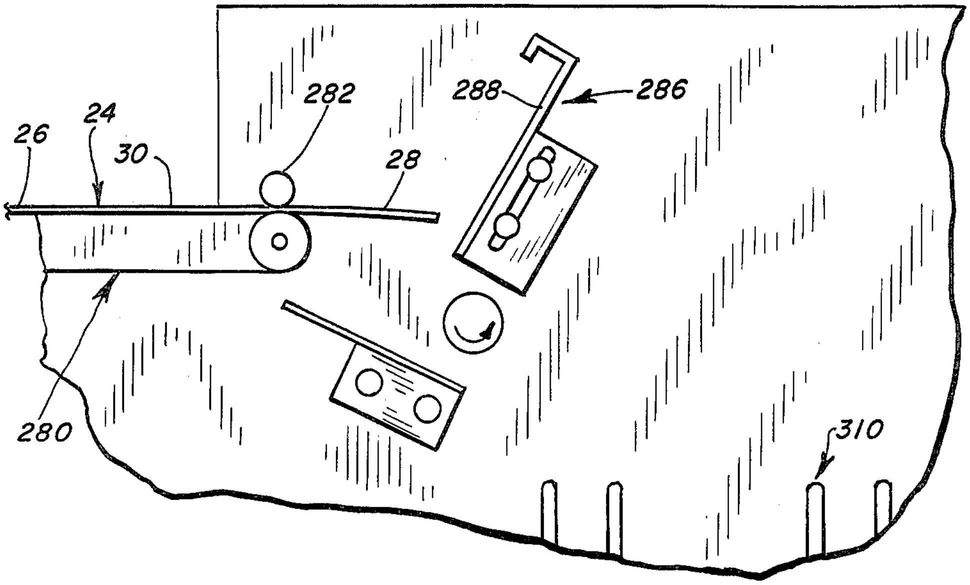
FIG. 9 is a simplified, diagrammatic view of a portion of the envelope contents exposing apparatus showing an envelope closing and stacking mechanism.

A means for stacking opened and emptied envelopes may be provided with the apparatus as best illustrated in FIGS. 9-13. FIG. 9 illustrates an envelope 24 on a conveyor 280 substantially identical to conveyor 80 discussed above with reference to the first embodiment illustrated in FIG. 1 or to the conveyor 180 of the embodiment illustrated in FIGS. 6-7B. Thus, conveyor 280 is located downstream of the rotating vacuum cylinder and operators would typically remove the contents from the opened envelopes 24 while the envelopes 24 are on the conveyor 280. Each empty envelope continues to travel on the conveyor 280 with the first panel 26 trailing, but connected to, the leading second panel 28 along edge 30.

At the end of the conveyor 280, a drive roller 282 is provided above the conveyor 280. The roller 282 is driven by suitable means (not illustrated) to rotate in a direction to grip and pull the envelope 224 between the nip defined by the roller 282 and a conveyor 280.

A deflecting means 286 is spaced from the end of the conveyor 20 in the path of the opened envelope 24 and presents a deflecting surface 28 against which the second panel 28 of the envelope 24 impinges.

Figure 10:
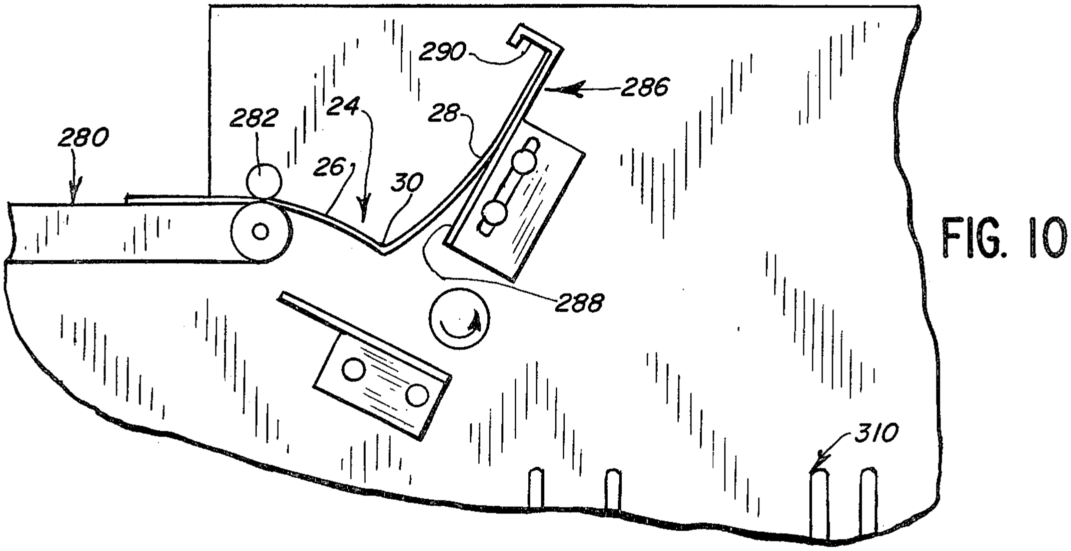
FIGS. 10-13 are views similar to FIG. 9 but showing the various positions of an envelope being moved through the closing and stacking mechanism.
Figure 11:
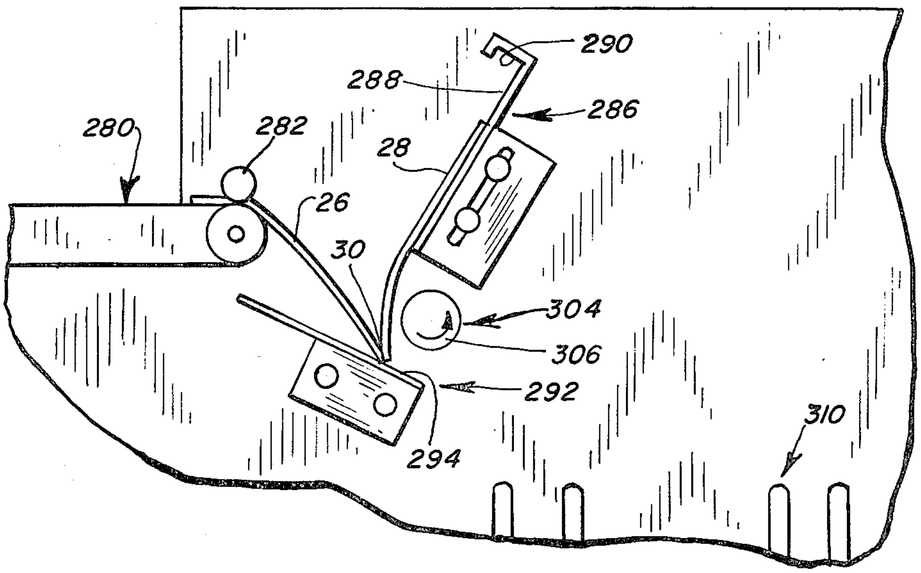

As best illustrated in FIGS. 10 and 11, the second panel of the envelope rides up the deflecting surface 288. Preferably, the deflecting means has an upper portion presenting an outwardly extending impingement surface 290 against which the distal end of the second panel 28 may ultimately impinge.

As best illustrated in FIG. 11, an abutment means 292 is provided below the deflecting means 286 for presenting an abutment surface 294 against which the envelope connected edge portion 30 and first panel 26 fall and slide downwardly along. Also, a roller means 304 is provided adjacent the deflecting means 286 and abutment means 292. The roller means includes a roller 306 which is driven by suitable means (not illustrated) to rotate (in the counterclockwise direction as viewed in FIG. 11) against the second panel 28 of the envelope.

Figure 12:
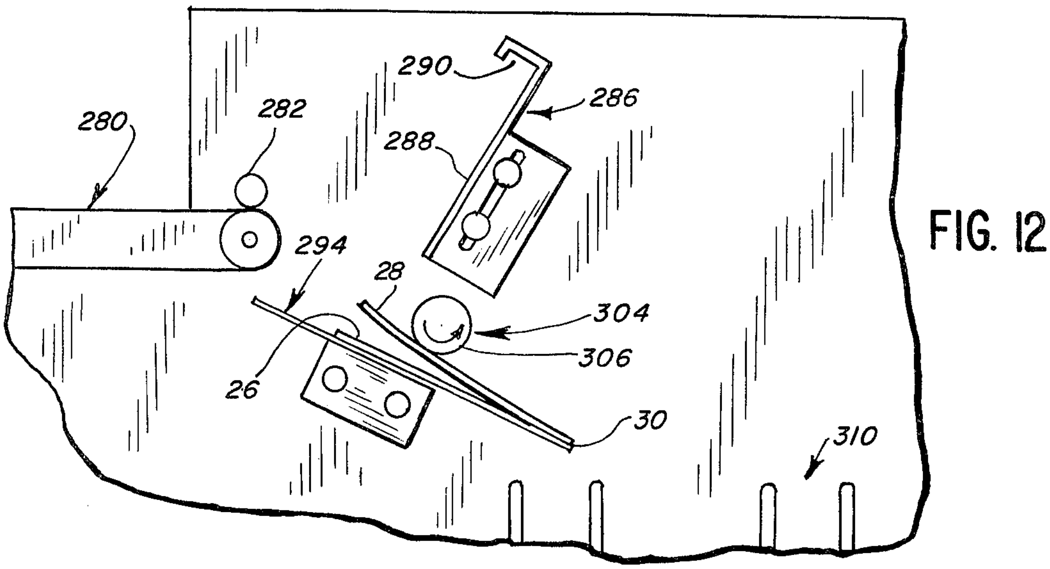

As best illustrated in FIGS. 11 and 12, the envelope panels 26 and 28 begin to pivot towards each other about the connected edge portion 30. The rotating roller 306 engages the back of the panel 28 and propels the envelope along the downwardly sloping abutment surface 294 thereby closing the first and second panels of the envelope and moving the envelope off of the abutment means 294.

Figure 13:
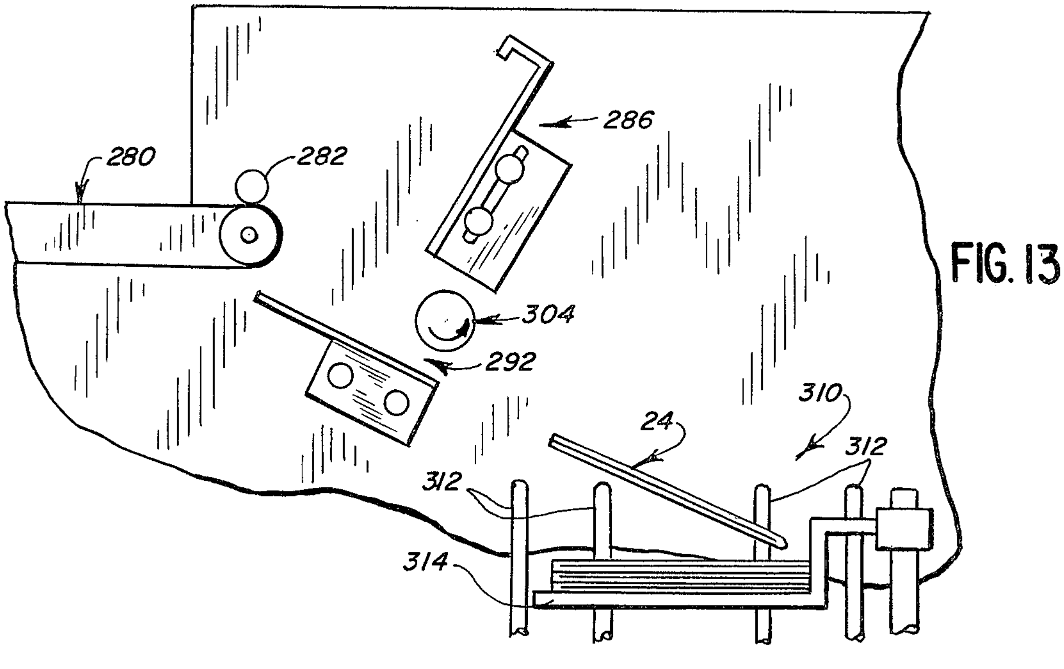

Preferably, and as best illustrated in FIG. 13, a suitable receiving means or station 310 is provided adjacent and below the abutment surface 294 for receiving the closed empty envelopes 24. Specifically, the station 310 includes a suitable cage constructed from rods 312 and adapted to receive the envelopes 24 in a stack. The stack is supported by a movable bottom plate 314 which is preferably driven by a suitable mechanism (not illustrated) in a downward direction as the stack height increases. This maintains the top of the stack at a substantially constant elevation.

From the foregoing, it will be observed that numerous variations and modifications may be effected without departing from the true spirit and scope of the novel concept of the invention. It is to be understood that no limitation with respect to the specific apparatus illustrated herein is intended or should be inferred. It is, of course, intended to cover by the appended claims all such modifications as fall within the scope of the claims.

What is claimed is:

1. An apparatus for closing opened, emptied envelopes wherein each envelope has first and second panels separated from each other along all but one straight edge portion where the panels remain connected and wherein the first and second panels are opened and lie on opposite sides of said connected edge portion, said apparatus comprising:

(a) means for moving said empty envelopes along a path seriatim with said first and second panels positioned on opposite sides of said connected edge portion and with said first panel trailing said second panel;

(b) deflecting means in said path for presenting a deflecting surface against which said second panel impinges and moves upwardly along;

(c) abutment means below sad deflecting means for presenting an abutment surface against which said connected edge portion and said first panel fall and slide downwardly along; and (d) rotating roller means, adjacent said deflecting means and said abutment means, for engaging said second panel and propelling said envelope along said abutment surface to close said first and second panels.

2. The apparatus in accordance with claim 1 further including a receiving station disposed adjacent and below said abutment surface for receiving said closed envelopes seriatim to form a stack.

3. A method for closing opened, emptied envelopes wherein each envelope has first and second panels separated from each other along all but one straight edge portion where the panels remain connected and wherein the first and second panels are opened and lie on opposite sides of said connected edge portion, said method comprising the steps of:

(a) supporting and moving said empty envelopes along a first path seriatim with said first and second panels positioned on opposite sides of said connected edge portion and with said first panel trailing said second panel;

(b) deflecting said second panel upwardly and terminating the support of said first panel to permit said envelope to fall downwardly with the envelope oriented with said connected edge portion below the remaining portions of the envelope; and (c) deflecting said connected edge portion to guide said connected edge portion and the first panel downwardly along a second path whereby the first and second panels are closed.

4. An apparatus for exposing the contents of an envelope which has first and second opposing panels wherein the panels have been separated from each other along all but one straight edge portion where the panels remain connected, said apparatus comprising:

(a) continuously operating first moving means for moving said envelope along a first path, said first moving means including continuously moving first conveyor means and first means for reducing the pressure at the surface of said first conveyor means when said envelope is on said first conveyor means whereby said envelope is held against said first conveyor means by the pressure differential between the ambient atmospheric pressure and the reduced air pressure under portions of said envelope on said first conveyor means;

(b) aligning means along said first path for temporarily interrupting the movement of said envelope along said first path and for aligning said envelope relative to said first path with said one straight edge portion aligned generally perpendicular to the direction of movement of the envelope along said first path;

(c) control means responsive to the presence of said envelope in said first path for effecting actuation of said aligning means to allow said continuously operating first moving means to move said envelope further along said first path;

(d) tilting means at the end of said first moving means for receiving said envelope from said first moving means and for gripping said first panel of said envelope and for tipping said envelope to orient the connected edge portion of the envelope below the rest of the envelope to permit the ungripped second panel to fall away from the gripped first panel under the influence of gravity, said tilting means including a generally cylindrical member oriented with the longitudinal axis generally normal to the direction of movement of the envelope along said first path on said first moving means, said cylindrical member having an interior chamber portion and defining in the exterior surface of the member a plurality of apertures communicating with the interior chamber portion, said tilting means further including means for reducing the pressure within said interior chamber of said cylindrical member whereby said envelope first panel is held against said cylindrical member by the greater ambient air pressure, and in which said tilting means includes means for rotating said cylindrical member to move at least said gripped panel of the envelope in a locus defined by a portion of a circular arc with the connected edge portion of the envelope leading the movement of the envelope in said locus; and (e) continuously operating second moving means adjacent said tilting means for receiving said ungripped second panel as it falls away from said first panel and for moving said envelope along a second path away from said tilting means to move said first panel off of said tilting means onto said second moving means with the first and second panels opened and lying in said second path on opposite sides of said connected edge portion with the envelope contents thereby exposed on top of at least one of said first and second panels, said second moving means being disposed relative to both said first moving means and said cylindrical member so as to result in said cylindrical member being located between said first and second moving means, said second moving means including continuously moving second conveyor means and second means for reducing the pressure at the surface of said second conveyor means when said envelope is on said second conveyor means whereby said envelope is held against said second conveyor means by the pressure diferential between the ambient atmospheric pressure and the reduced air pressure under portions of said envelope on said second conveyor means.

* * * * *